UNITED STATES PATENT OFFICE.

ZDENKO H. SKRAUP, OF VIENNA, AUSTRIA, ASSIGNOR TO BADISCHE ANILIN AND SODA FABRIK, OF BADEN, GERMANY.

PRODUCTION OF OXYCHINOLINE.

SPECIFICATION forming part of Letters Patent No. 237,918, dated February 15, 1881.

Application filed January 6, 1881. (Specimens.)

*To all whom it may concern:*

Be it known that I, ZDENKO HANNS SKRAUP, a subject of the Emperor of Austria, residing at Vienna in the Empire of Austria, have invented new and useful Improvements in Oxychinoline produced from Para-Nitro-Phenol and Para-Amido-Phenol, of which the following is a specification.

This invention relates to the production of oxychinoline, a substance intended for the manufacture of blue dye-stuffs and for other purposes.

My invention consists in the discovery that oxychinoline may be obtained from carbolic acid (phenol) by heating mixtures of nitro and amido phenols with glycerine and sulphuric acid.

As an example of the manner in which my invention may be carried into effect, I proceed as follows: Fourteen parts, by weight, of para-nitro-phenol are intimately mixed with twenty-one parts, by weight, of para-amido-phenol, and with sixty parts, by weight, of glycerine of about 1.26 specific gravity. I then add fifty parts, by weight, of concentrated sulphuric acid of about 1.848 specific gravity, and the mixture is heated in a suitable still or vessel, and at a temperature not exceeding about 150° centigrade, during about two hours, or until little, if any, nitro-phenol will be found unchanged in the mixture.

In order to separate the oxychinoline thus formed various methods may be employed. For instance, the acid mixture may be rendered slightly alkaline by the addition of a fixed caustic or carbonated alkali, and the oxychinoline thus set free may then be extracted by means of a suitable solvent—such as, for instance, sulphuric ether—when, after evaporation of the said solvent, the oxychinoline will be obtained in its solid condition. The separation of the oxychinoline may likewise be effected by employing the method of "fractional precipitation," as is well understood by chemists. For this purpose the said mixture containing the oxychinoline is gradually mixed with solutions of a fixed caustic or carbonated alkali until no longer any dark-colored and resinous precipitates are thereby produced. The mixture is then filtered, and from the filtered liquid thus obtained oxychinoline is precipitated by the addition of the aforesaid alkaline solution. A further purification may be effected by converting oxychinoline into suitable saline compounds—say, for instance, into its oxalate, and by crystallization of the same.

Some characteristic properties of oxychinoline thus produced, as above described, are as follows: It is a whitish crystalline solid, easily soluble in alcohol, difficultly soluble in water. It dissolves in both acids and alkalies. It is not volatile at an ordinary temperature, nor can it be volatilized in an atmosphere of steam. It exhibits no color-reaction upon the addition of ferric chloride.

What I claim as new, and desire to secure by Letters Patent, is—

1. As a new article of manufacture, oxychinoline produced by the action of glycerine and sulphuric acid upon a mixture of para-nitrophenol and para-amido-phenol, substantially as described, or by any other means which will produce a like result.

2. The within-described process of producing oxychinoline by the action of glycerine and sulphuric acid upon a mixture of para-nitrophenol and para-amido-phenol, substantially as described.

In testimony whereof I have hereunto set my hand in the presence of two subscribing witnesses.

ZDENKO HANNS SKRAUP.

Witnesses:
  Dr. RICHARD HASENÖHRL,
  GUSTAV HIEDEREST.